United States Patent [19]

Newkirk et al.

[11] Patent Number: 5,141,902

[45] Date of Patent: Aug. 25, 1992

[54] COMPOSITE CERAMIC STRUCTURES

[75] Inventors: Marc S. Newkirk, Newark; Danny R. White, New Castle; Ratnesh K. Dwivedi, Wilmington, all of Del.

[73] Assignee: Lanxide Technology Company, LP, Newark, Del.

[21] Appl. No.: 766,946

[22] Filed: Sep. 27, 1991

Related U.S. Application Data

[63] Continuation of Ser. No. 541,437, Jun. 22, 1990, Pat. No. 5,053,367, which is a continuation of Ser. No. 267,450, Nov. 4, 1988, abandoned, which is a continuation of Ser. No. 52,806, May 21, 1987, Pat. No. 4,833,110, which is a continuation-in-part of Ser. No. 908,123, Sep. 16, 1986, abandoned.

[51] Int. Cl.⁵ ............................................. C04B 35/10
[52] U.S. Cl. ................................... 501/127; 501/119
[58] Field of Search ............... 501/119, 127, 128, 133, 501/134, 103

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,669,695 | 6/1972 | Iler | 501/87 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 5,053,367 | 10/1991 | Newkirk et al. | 501/127 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |

OTHER PUBLICATIONS

"Oxidation of Molten Aluminum Alloys, Reaction with Refractories"-M. Drouzy and M. Richard—Mar. 1974, Fonderie, France No. 332, pp. 121-128.

"Refractories for Aluminum Alloy Melting Furnaces'-'-B. Clavaud and V. Jost—Sep. 1980—Lillian Brassinga (from French) Jan. 1985.

*Primary Examiner*—Karl Group
*Assistant Examiner*—Chris Gallo
*Attorney, Agent, or Firm*—Mark G. Mortenson; William E. McShane

[57] ABSTRACT

A self-supporting ceramic composite body produced by a method which comprises preparing a polycrystalline material as the oxidation reaction product of a parent metal with a vapor-phase oxidant, comminuting the resulting material to a particulate, forming a permeable mass of said particulate as filler, and infiltrating said particulate with an oxidation reaction product of a parent metal with a vapor-phase oxidant, thereby forming said ceramic composite body.

19 Claims, 2 Drawing Sheets

COMPOSITE CERAMIC STRUCTURES

This is a continuation of copending application Ser. No. 541,437 filed Jun. 22, 1990 which issued on Oct. 1, 1991, as U.S. Pat. No. 5,053,367, which was a Rule 62 continuation of application Ser. No. 267,450, filed on Nov. 4, 1988, now abandoned, which was a Rule 60 continuation of application Ser. No. 052,806, filed on May 21, 1987, and which issued to U.S. Pat. No. 4,833,110 on May 23, 1989. Application Ser. No. 052,806 was a continuation-in-part of application Ser. No. 908,123, filed on Sep. 16, 1986, and now abandoned.

FIELD OF THE INVENTION

This invention relates to a novel method for producing a ceramic composition body. More particularly, this invention relates to an improvement in the method for producing a ceramic composite body by "growing" a polycrystalline material comprising an oxidation reaction product from a parent metal into a permeable mass of filler comprising comminuted particles of a polycrystalline material produced anteriorly by essentially the same generic process.

BACKGROUND

In recent years there has been an increasing interest in substituting ceramics for metals because, with respect to certain properties, ceramics are superior to metals. There are, however, several known limitations or difficulties in making this substitution such as scaling versatility, capability to produce complex shapes, satisfying the properties required for the end-use application, and costs. Many of these limitations or difficulties have been overcome by the inventions disclosed in patents and patent applications assigned to the same assignee as this application and discussed in the subsequent section, which provide novel methods for reliably producing ceramic materials, including shaped composites.

DESCRIPTION OF COMMONLY OWNED PATENTS AND PATENT APPLICATIONS

The following commonly owned patents and patent applications describe novel methods for producing a self-supporting ceramic body by oxidation of a parent to form a polycrystalline oxidation reaction product and, optionally, metallic constituents:

(A) U.S. Pat. No. 4,713,360, which issued on Dec. 15, 1987, from U.S. patent application Ser. No. 818,943, filed Jan. 15, 1986, which is a continuation-in-part of Ser. No. 776,964, filed Sep. 17, 1985, and now abandoned, which was a continuation-in-part of Ser. No. 705,787, filed Feb. 26, 1985, and now abandoned, which was a continuation-in-part of U.S. application Ser. No. 591,392, filed Mar. 16, 1984, and now abandoned, all in the names of Marc S. Newkirk et al and entitled "Novel Ceramic Materials and Methods for Making the Same";

(B) U.S. Pat. No. 4,853,352, which issued on Aug. 1, 1989, from U.S. patent application Ser. No. 220,935, filed on Jun. 23, 1988, which is a continuation of U.S. patent application Ser. No. 822,999, filed Jan. 27, 1986, and now abandoned, which was a continuation-in-part of Ser. No. 776,965, filed Sep. 17, 1985, and now abandoned, which was a continuation-in-part of Ser. No. 747,788, filed Jun. 25, 1985, and now abandoned, which was a continuation-in-part of Ser. No. 632,636, filed Jul. 20, 1984, and now abandoned, all in the names of Marc S. Newkirk et al and entitled "Methods of Making Self-Supporting Ceramic Materials"; and (C) U.S. Pat. No. 4,851,375, which issued on Jul. 25, 1989, from U.S. patent application Ser. No. 819,397, filed Jan. 17, 1986, which is a continuation-in-part of Ser. No. 697,876, filed Feb. 4, 1985, and now abandoned, both in the names of Marc S. Newkirk et al and entitled "Composite Ceramic Articles and Methods of Making Same".

The entire disclosures of each of the aforesaid Commonly Owned Patents and Patent Applications are incorporated herein by reference.

As explained in these Commonly Owned Patents and Patent Applications, novel polycrystalline ceramic materials or polycrystalline ceramic composite materials are produced by the oxidation reaction between a parent metal and a vapor-phase oxidant, i.e. a vaporized or normally gaseous material, as an oxidizing atmosphere. The method is disclosed generically in the aforesaid Commonly Owned Patent Applications (A) U.S. Pat. No. 4,713,360. In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patents and Patent Applications and in this application, and refers to the loss or sharing of electrons by a metal to an oxidant which may be one or more elements and/or compounds. Accordingly, elements other than oxygen, or compounds, may serve as the oxidant, as explained below in greater detail.

In certain cases, the parent metal may require the presence of one or more dopants in order to favorably influence or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically α-alumina.

The aforesaid Commonly Owned Patent Applications (B) U.S. Pat. No. 4,853,352 discloses a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Novel ceramic composite structures and methods of making them are disclosed and claimed in the aforesaid Commonly Owned Patent Applications (C) U.S. Pat. No. 4,851,375 which utilizes the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with a vapor-phase oxidant, as described above, to form an oxidation reaction product. As the oxidation reaction product grows and infiltrates the adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler.

Thus, the aforesaid Commonly Owned Patents and Patent Applications describe the production of oxidation reaction products readily "grown" to desired sizes and thicknesses heretofore believed to be difficult, if not impossible, to achieve with conventional ceramic processing techniques. The present invention provides a further improvement for use in the production of ceramic composite products.

SUMMARY OF THE INVENTION

This invention relates to an improved method for producing a polycrystalline ceramic composite body by infiltrating a permeable mass or bed of filler with a ceramic matrix comprising a polycrystalline oxidation reaction product grown by the oxidation of a molten parent metal in accordance with the aforesaid Commonly Owned Patents and Patent Applications. The filler comprises a comminuted version of polycrystalline material also made in accordance with the aforesaid Commonly Owned Patents and Patent Applications. Using a filler which is a substantial replicate (but not necessarily an exact replicate) of the ceramic material made anteriorly to the composite product by essentially the same process provides for enhanced kinetics and improved morphology, as described below in greater detail.

In the practice of this invention, a parent metal is heated in the presence of a vapor-phase oxidant to form a body of molten metal which is in contact with a bed of permeable filler. Oxidation reaction product is formed as molten metal contacts the oxidant, and the process conditions are maintained to progressively draw molten metal through the formed oxidation reaction product and toward the oxidant so as to continuously form oxidation reaction product at the interface between the oxidant and previously formed oxidation reaction product.

The heating step is conducted at temperatures above the melting point of the parent metal but below the melting temperature of the oxidation reaction product and heating is continued for such time as is necessary to produce a polycrystalline ceramic body of the desired size. The body may include one or more metallic constituents such as nonoxidized parent metal, or voids, or both.

The improvement of this invention is based on the discovery that a self-supporting ceramic composite body can be obtained by utilizing as a filler a comminuted replicate or form of the polycrystalline material obtained according to the oxidation reaction process described in this Summary section and in greater detail in the Commonly Owned Patent Applications. The polycrystalline material thus obtained as a first-stage is ground, pulverized, or the like, and a mass of the resulting filler, preferably shaped as a permeable preform, is placed adjacent to a second body of the parent metal and the resulting assembly is subjected to the oxidation reaction process as a second-stage. This reaction process is continued for a time sufficient to infiltrate at least a portion of the filler bed with the polycrystalline oxidation reaction product formed from the second parent metal so that a ceramic composite body of the desired dimensions can be obtained.

More specifically, a second parent metal is positioned or oriented relative to the permeable mass of filler material so that formation of the oxidation reaction product from the second parent metal will occur in a direction towards and into the mass of filler. The growth of oxidation reaction product infiltrates or embeds the mass of filler thereby forming the desired composite ceramic structure. The filler may be a loose or bonded array characterized by interstices, openings or intervening spaces, and the bed or mass is permeable to the vapor-phase oxidant and to the growth of oxidation reaction product. As used herein and in the appended claims, "filler" or "filler material" is intended to mean either a homogeneous composition or a heterogeneous composition comprised of two or more materials. Thus, the filler may have admixed with it one or more additional filler materials which may be prepared by conventional methods. Still further, the parent metals and the oxidants used in the process for providing the replicated filler may be substantially the same or different in composition from that used in producing the final composite product.

The oxidation reaction product grows into the filler without disruption or displacement of the filler constituents as a result of which a relatively dense composite ceramic body is formed without the use of high temperatures and high pressures. Moreover, the present process reduces or obviates the need for chemical and physical compatability, conditions which are generally required when pressureless sintering techniques are employed in ceramic composite production.

The ceramic composite bodies which are produced by the present invention exhibit highly desirable electrical, wear, thermal and structural characteristics and, if necessary, they may be machined, polished, ground, or the like to afford products which have a variety of industrial applications.

As used in this specification and the appended claims, the following terms have the following meaning:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within the range of from about 1–40% by volume, but may include still more metal.

"Oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, a halogen, sulphur, phosphorus, arsenic, carbon, boron, selenium, tellurium, and compounds and combinations thereof including, for example, methane, oxygen, ethane, propane, acetylene, ethylene, propylene, and mixtures such as air, $H_2/H_2O$ and a $CO/CO_2$, the latter two (i.e., $H_2/H_2O$ and $CO/CO_2$) being useful in reducing the oxygen activity of the environment.

"Oxidant", "vapor-phase oxidant" or the like, which identifies the oxidant as containing or comprising a particular gas or vapor, means an oxidant in which the identified gas or vapor is the sole, or predominant, or at least a significant oxidizer of the parent metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant as used herein and in the claims is "forming gas", which typically contains about 96 volume percent nitrogen and about 4 volume percent hydrogen.

"Parent metal" refers to that metal, e.g. aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g. aluminum, the metal identified should be read with this definition in mind unless indicated otherwise by the context.

DETAILED DESCRIPTION OF THE INVENTION AND PREFERRED EMBODIMENTS

Figure 1A:
FIGS. 1A and 1B are photographs showing the external growth morphology of specimens obtained by oxidizing a parent metal of aluminum alloy 380.1 into particle beds of, in the case of FIG. 1A, a grown and crushed alumina material and, in the case of FIG. 1B, a fused alumina material.

In accordance with the present invention for producing self-supporting ceramic composite bodies, a parent metal is heated to a molten state in the presence of a vapor-phase oxidant to form an oxidation reaction product which infiltrates a bed or mass of filler. The filler utilized is comminuted particles of the polycrystalline material produced anteriorly by substantially the same process (i.e., as a first-state). This filler exhibits an affinity for the oxidation reaction product grown during the process for producing the final composite product, (i.e., in a second-stage) apparently attributable to an affinity between like substances under the process conditions; that is, there is an apparent affinity for growing reaction product into its replicate. Because of this affinity, we have observed enhanced growth kinetics, and consequently growth occurs at a somewhat faster rate relative to substantially the same process not using a replicated filler. In addition, we have observed an improvement in morphology, contributing to the high quality replication of a parent metal pattern by the ceramic body, as fully illustrated in the examples below, and disclosed in copending U.S. Pat. No. 4,828,785, which issued on May 9, 1989, from U.S. patent application Ser. No. 823,542, filed on Jan. 27, 1986, and assigned to the same assignee, and incorporated herein by reference.

One factor which appears to contribute to these improved characteristics is the presence of a dopant material intimately associated with the filler. For example, when alumina as the oxidation reaction product is formed upon the oxidation reaction of aluminum in air, a dopant material typically is used in association with or in combination with the aluminum parent metal. The dopant, or a portion thereof, may not be exhausted from the reaction system, and therefore becomes dispersed through part or all of the polycrystalline material. In such a case, the dopant material may be concentrated in the initiation surface of the external surface of the polycrystalline material, or may be intimately bonded with the microstructure of the oxidation reaction product, or may be alloyed with the metallic component of the polycrystalline material. When the polycrystalline material is comminuted for use as a filler, this dopant material incorporated as part of the filler now serves as a useful dopant in the production of the final composite product. For example, silicon is a useful dopant for the oxidation reaction of aluminum in air, and a significant percentage of silicon will alloy with the metal phase of the polycrystalline material. When used as a filler, this polycrystalline material contains a built-in dopant for use in making an alumina composite.

The ceramic body produced as the source of filler for the final composite product is comminuted to the desired size as by impact milling, roller milling, gyratory crushing, or other conventional techniques depending largely upon the particle size desired and the composition of the polycrystalline material. The ground or milled ceramic material is sized and recovered for use as a filler. It may be desirable to first crush the ceramic body into large pieces of about ¼ inch to ½ inch as with a jaw crusher, hammer mill, etc., and then into finer particle of 50 mesh or finer as by impact milling. The particulate is typically screened to obtain fractions of desired size. Suitable fillers may range in size from 100 to 500 mesh or finer depending upon the ceramic composite body to be made and its end use.

As explained above, the polycrystalline material formed may contain metallic components such as nonoxidized parent metal. The amount of metal can vary over a wide range of 1 to 40 percent by volume, and sometimes higher, depending largely upon the degree of exhaustion (conversion) of parent metal used in the process. It may be desirable to separate at least some of the metal, particularly the larger sections, from the oxidation reaction product before using the material as a filler. This separation can be conveniently achieved after the polycrystalline material has been crushed or ground. The oxidation reaction product is usually more easily fractured than the metal, and it therefore may be possible in some cases to partially separate the two constituents by comminuting and screening.

Also, any unoxidized parent metal present in the filler will be in particulate form, and when used in forming a final product, will undergo oxidation reaction leaving voids in the ceramic matrix corresponding in size to the metal particles. Such voids disposed throughout the ceramic matrix may or may not be desirable depending upon the properties sought for the composite and its end use. If a high volume percent of voids is desirable for the end product, such as for increasing the thermal insulation of the composite, it would be advantageous to use filler having a substantial amount of nonoxidized parent metal. This built-in porosity can be restricted to a portion of the composite only by forming a layered bed of filler comprising (1) filler with particulate parent metal and (2) the relatively pure filler (metal removed) or filler from another source.

It will be observed that in accordance with the present invention, the parent metal used in producing the filler may be substantially the same or different from the parent metal used in producing the final ceramic composite product. This may be desirable in that it affords the use of a filler having the several advantages enumerated above, but the oxidation reaction product is different in chemical composition from the oxidation reaction product of the final product. For example, by this embodiment it is possible to form an aluminum oxide ceramic body by the oxidation reaction process of an aluminum parent metal in an oxygen atmosphere for subsequent use as a filler in a ceramic matrix of aluminum-nitride formed upon the oxidation reaction of an aluminum parent metal in a nitrogen atmosphere.

In an alternative embodiment, the filler utilized in producing the final composite product is itself derived from a ceramic composite formed by the oxidation reaction process, and then comminuted and sieved to size. The filler used in making the ceramic composite body which is the precursor filler to the final product, may be selected to augment or improve the properties of the final product. This may be achieved by selecting a filler different in composition from the oxidation reaction product so that the resulting precursor filler will be composed of or contain two components which may be intimately bonded as a microcomposite. In making the ceramic composite structure body by this embodiment, a first source of parent metal and a permeable bed or mass of filler material are oriented relative to each other so that formation of the oxidation reaction product will occur in a direction towards and into said bed of filler material. The first source of parent metal is heated in the presence of a vapor-phase oxidant to form a body of molten parent metal which reacts with the oxidant in this temperature region to form an oxidation reaction product. The oxidation reaction product is in contact with, and extends between, the body of molten metal and the oxidant, thereby progressively drawing molten metal through the oxidation reaction product towards the oxidant and into the mass of filler material so that the oxidation reaction product continues to form at the interface between the oxidant and previously formed oxidation reaction product. The reaction is continued for a time sufficient to infiltrate at least a portion of the bed of filler material with a polycrystalline material comprising oxidation reaction product and, optionally, one or more metallic constituents such as nonoxidized parent metal. The resulting polycrystalline composite body is comminuted to a particulate size suitable for use as a second filler, and a permeable mass of this second filler (which may be of a different composition) is oriented relative to a second source of parent metal so that formation of an oxidation reaction product will occur in a direction towards and into this mass of second filler. The oxidation reaction process is repeated as set forth above, and continued for a time sufficient so that the oxidation reaction product infiltrates at least a portion of the mass of second filler thereby forming the final ceramic composite product.

The properties of the ceramic composite products of this invention can vary depending upon such factors as the choice of parent metal, the composition of the fillers, and the oxidant. Typical properties sought for these composites, which can be tailored, include hardness, flexural strength, fracture toughness and elastic modulus. The composite products generally are adaptable or fabricated, such as by machining, polishing, grinding, etc., for use as articles of commerce which, as used herein, are intended to include, without limitation, industrial, structural, and technical ceramic bodies for applications where electrical, wear, thermal, structural or other features or properties are important or beneficial.

Although the present invention is described herein with particular emphasis on systems wherein aluminum or an aluminum alloy is employed as the parent metal and alumina is the intended oxidation reaction product, this reference is for exemplary purposes only, and it is to be understood that the parent invention is adaptable by application of the teachings herein to other systems wherein other metals such as tin, silicon, titanium, zirconium, etc., are employed as the parent metal. Further, the intended oxidation reaction product is metal oxide, nitride, boride, carbide, and the like, of the parent metal.

In somewhat greater detail as to certain process steps, the parent metal (which may be doped, as explained above) as the precursor to the oxidation reaction product, is formed into an ingot, billet, rod, plate, or the like, and placed in an inert bed, crucible or other refractory container. This container with its contents is placed in a furnace which is supplied with a gas oxidant. This setup is heated to temperatures below the melting point of the oxidation reaction product but above the melting point of the parent metal which temperature region, for example, in the case of aluminum using air as the vapor-phase oxidant, is generally between about 850°–1450° C. and more preferably between about 900°–1350° C. Within this operable temperature interval or range, a body or pool of molten metal forms, and on contact with the oxidant, the molten metal will react to form a layer of oxidation reaction product. Upon continued exposure to the oxidizing environment, molten metal is progressively drawn into and through any previously formed oxidation reaction product in the direction of the oxidant. On contact with the oxidant, the molten metal will react to form additional oxidation reaction product and thus form a progressively thicker oxidation reaction product while, optionally, leaving metallic constituents dispersed through the polycrystalline material. The reaction of the molten metal with the oxidant is continued until the oxidation reaction product has grown to a desired limit or boundary.

In the embodiment where a ceramic composite body is prepared to serve as the precursor filler, the parent metal and a permeable mass of filler material are positioned adjacent to each other and oriented with respect to each other so that growth of the oxidation reaction product as described above will be in a direction towards the filler material in order that the filler, or a part thereof, will be infiltrated by the growing oxidation reaction product and embedded therein. This positioning and orientation of the parent metal and filler with respect to each other may be accomplished by simply embedding a body of parent metal within a bed of particulate filler material or by positioning one or more bodies of parent metal within, or or adjacent to a bed or other assembly of filler material. The assembly is arranged so that a direction of growth of the oxidation reaction product will permeate or infiltrate at least a portion of the filler material. The filler may comprise, for example, powders or other particulates, aggregate, refractory fiber, tubules, whiskers, spheres, platelets, or the like or a combination of the foregoing. Further, suitable filler materials may include, for example, metal oxides, nitrides or carbides such as alumina, magnesia, hafnia, zirconia, silicon carbide, silicon nitride, zirconium nitride, titanium nitride, etc., as explained in the Commonly Owned Patents and Patent Applications.

The resulting polycrystalline material may exhibit porosity which may be a partial or nearly complete replacement of the metal phase(s), but the volume percent of voids will depend largely on such conditions as temperature, time, type of parent metal, and dopant concentrations. Typically in these polycrystalline ceramic structures, the oxidation reaction product crystallites are interconnected in more than one dimension preferably in three dimensions, and the metal may be at least partially interconnected.

The polycrystalline ceramic material (or composite material if made) is now comminuted and sized for use as a filler in producing the final composite product. This particulate filler, which may be admixed with still other filler materials, is formed into a permeable bed, preferably into a shaped preform. The bed and a second parent metal are oriented relative to each other so that formation of an oxidation reaction product will occur in a direction towards and into the bed. The process steps as outlined above are essentially repeated. The reaction process is continued for a time sufficient so that oxidation reaction product infiltrates at least a portion of the bed, or to the desired boundary of the preform, thereby forming the ceramic composite body.

A particularly effect method for practicing this invention involves forming the filler into a preform with a shape corresponding to the desired geometry of the final composite product. The preform may be prepared by any of a wide range of conventional ceramic body formation methods (such as uniaxial pressing, isostatic pressing, slip casting, sedimentation casting, tape casting, injection molding, filament winding for fibrous materials, etc.) depending largely on the characteristics of the filler. Initial binding of the particles prior to infiltration may be obtained through light sintering or by use of various organic or inorganic binder materials which do not interfere with the process or contribute undesirable by-products to the finished material. The preform is manufactured to have sufficient shape integrity and green strength, and is thus self-supporting. The preform should also be permeable to the transport of oxidation reaction product, preferably having a porosity of between about 5 and 90% by volume and more preferably between about 25 and 50% by volume. Also, an admixture of filler materials and mesh sizes may be used. The preform is then contacted with molten parent metal on one or more of its surfaces for a time sufficient to complete growth and infiltration of the preform to its surface boundaries.

As disclosed in copending and allowed U.S. patent application Ser. No. 861,024, filed on May 8, 1989, and assigned to the same owner, a barrier means may be used in conjunction with the filler material or preform to inhibit growth or development of the oxidation reaction product beyond the barrier. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed or preform is especially desirable. For example, if the preform comprises alumina and the resulting ceramic comprises alumina, the barrier may be admixed with alumina particulate, desirably having a mesh size of about 20-1000, but may be still finer. Other suitable barriers include refractory ceramics or metal sheaths which are open on at least one end to permit a vapor-phase oxidant to permeate the bed and contact the molten parent metal.

As a result of using a preform, especially in combination with a barrier means, a net shape is achieved, thus minimizing or eliminating expensive final machining or grinding operations.

As a further embodiment of the invention and as explained in the Commonly Owned Patents and Patent Applications, the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, e.g., the support zone of the preform, or any combination of two or more of techniques (1), (2), and (3) may be employed. For example, an alloyed dopant may be used in combination with an externally applied dopant. In the case of technique (3), where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent the parent metal. Application of any of the dopants to the preform may also be accomplished by applying a layer of one or more dopant materials to and within the preform, including any of its internal openings, interstices, passageways, intervening spaces, or the like, that render it permeable. A convenient manner of applying any of the dopant material is to merely soak the entire bed in a liquid (e.g., a solution) of dopant material. As explained above, the dopant may be built into the filler which is used in producing the final composite product. A source of the dopant may also be provided by placing a rigid body of dopant in contact with and between at least a portion of the parent metal surface and the preform. For example, a thin sheet of silicon-containing glass (useful as a dopant for the oxidation of an aluminum parent metal) can be placed upon a surface of the parent metal. When the aluminum parent metal (which may be internally doped with Mg) overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable preform occurs. In the case where the dopant is externally applied to at least a portion of the surface of the parent metal, the polycrystalline oxide structure generally grows within the permeable preform substantially beyond the dopant layer (i.e., to beyond the depth of the applied dopant layer). In any case, one or more of the dopants may be externally applied to the parent metal surface and/or to the permeable preform. Additionally, dopants alloyed within the parent metal and/or externally applied to the parent metal may be augmented by dopant(s) applied to the preform. Thus, any concentration deficiencies of the dopants alloyed within the parent metal and/or externally applied to the parent metal may be augmented by additional concentration of the respective dopant(s) applied to the preform and vice versa.

Useful dopants for an aluminum parent metal, particularly with air as the oxidant, include, for example, magnesium, zinc, and silicon, in combination with each other or in combination with other dopants described below. These metals, or a suitable source of the metals, may be alloyed into the aluminum-based parent metal at concentrations for each of between about 0.1-10% by weight based on the total weight of the resulting doped metal. Concentrations within this range appear to initiate the ceramic growth, enhance metal transport and favorably influence the growth morphology of the resulting oxidation reaction product. The concentration range for any one dopant will depend on such factors as the combination of dopants and the process temperature.

Other dopants which are effective in promoting polycrystalline oxidation reaction product growth, for aluminum-based parent metal systems are, for example, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into a permeable bed or preform in selected areas. Thus, growth of the polycrystalline ceramic material can be controlled by the localized placement of the dopant material upon the parent metal surface. The applied coating or layer of dopant is thin relative to the thickness of the parent metal body, and growth or formation of the oxidation reaction product into the permeable bed or preform extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant; quantities as low as 0.00003 gram of silicon per gram of parent metal, or about 0.0001 gram of silicon per square centimeter of exposed parent metal surface, together with a second dopant having a source of magnesium and/or zinc produce the polycrystalline ceramic growth phenomenon. It also has been found that a ceramic structure is achievable from an aluminum parent metal containing silicon using air or oxygen as the oxidant by using MgO as the dopant in an amount grater than about 0.0008 gram of MG per gram of parent metal to be oxidized and greater than 0.003 gram of Mg per square centimeter of parent metal surface upon which the MgO is applied. It appears that to some degree an increase in the quantity of dopant materials may decrease the reaction time necessary to produce the ceramic composite, but this will depend upon such factors as type of dopant, the parent metal and the reaction conditions.

Where the parent metal is aluminum internally doped with magnesium and the oxidizing medium ia air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

The following examples are provided to illustrate the method and results of this invention.

EXAMPLE 1

Filler materials for the grown ceramic compositions of this invention were fabricated by crushing and milling of ceramic bodies prepared according to the methods of the Commonly Owned Patents and Patent Applications. Specifically, bars of a commercial aluminum alloy (a slightly impure version of alloy 380.1, described further below) were converted to ceramic by oxidizing in air at 1080° C. for 72 hours, sufficient time to complete the reaction of the aluminum parent metal. During this process the bars were supported in beds of aluminum oxide particles (Norton E-1 Alundum, 90 mesh particle size) and oxidation occurred from the exposed surface of the metal toward the air atmosphere. After cooling to ambient temperature, the grown ceramic pieces were separated from any loosely adhering particles of the bedding, from the thin oxide skin which had grown on the non-exposed metal surfaces, and from any residual metal remaining in the bedding.

These grown ceramic pieces were converted to particles for use as a composite filler by a combination of crushing and milling. Specifically, the materials were first crushed to a maximum particle size of $\frac{1}{4}$ inch by jaw crushing and then reduced further by dry vibratory milling for 24 hours. The resulting powder was sieved to separate out the $-100/+200$ mesh size fraction for the composite filler application.

As a control or comparison material, fused alumina particles (Norton 38 Alundum) originally of 14 mesh particle size were crushed in a roll crusher, dry ball milled, and sieved to separate out the $-100/+200$ mesh fraction, i.e., the same mesh fraction as was selected for the grown and crushed filler material.

Ceramic composite bodies were prepared using the two different fillers for comparison purposes. Two high alumina refractory boats were initially filled to a depth of approximately $\frac{1}{2}$ inch with a level layer of wollastonite, a material which acts as a barrier to the oxidation reaction process. A $9'' \times 2'' \times \frac{1}{2}''$ bar of aluminum alloy 380.1 was placed on top of the wollastonite layer in each boat. This alloy contains, in addition to aluminum, nominally (by weight) about 7.5–9.5% silicon, 3.0–4.0% copper, <2.9%; zinc, <1.0% iron, <0.5% manganese, <0.5% nickel, <0.35% tin, and less than 0.1% magnesium, however other samples of the 380.1 alloy lot used in this work were found to contain approximately 0.17–0.18% magnesium, a potentially important deviation from the nominal specification since magnesium is an established dopant or promoter of the oxidation reaction. The alloy bars were then surrounded on all sides but the bottom with particles of the filler materials to a depth of at least about $\frac{1}{2}$ inch, with one boat using the grown and crushed filler and the other boat using the fused alumina filler.

The refractory boats, filled as described above, were placed in an air furnace and heated to a temperature of 1000° C. using a firing cycle involving a 5-hour ramp to temperature, a 60-hour hold at temperature, and a 5-hour cooling period in the furnace. Subsequently, the grown ceramic composite was separated from the barrier and remaining bedding materials, and any loosely adhering particles were removed by a light grit blasting.

Figure 1B:

Analysis of the weight gain data for the two samples, taken as the change in weight of the refractory boat and its contents divided by the initial weight of aluminum alloy, indicates that approximately the same amount of reaction occurred into each of the fillers. Specifically, the oxygen pickup was 59% for the case of the grown and crushed filler and 56% for the fused alumina filler. However, as shown by a comparison of FIGS. 1A and 1B, growth into the grown and crushed filler was significantly more uniform, which is an important processing advantage.

A comparison of the mechanical properties obtained on specimens cut from the two different materials also reveals significant differences as summarized in Table 1. In this table, the modulus of elasticity was determined by a sonic velocity method, the fracture toughness was measured in a conventional Chevron notch test, and the modulus of rupture was determined in four point bending. The data in the table show a clear superiority in mechanical properties for the material prepared by growing into the grown and crushed filler.

TABLE 1

Comparison of Properties

| Property | Filler Material | |
|---|---|---|
| | Grown and Crushed | Fused Alumina |
| Hardness (Rockwell A Scale) | 84 | 71 |
| Modulus of Elasticity (GPa) | 316 | 202 |
| Fracture Toughness (MPa-m$^{1/2}$) | 4.67 | 2.74 |
| Modulus of Rupture (MPa) | 256 | 67 |

EXAMPLE 2

Figure 2A:
FIGS. 2A and 2B are photographs showing the external growth morphology of specimens obtained by oxidizing a parent metal of 99.7% pure aluminum into particle beds of, in the case of FIG. 2A, a grown and crushed alumina material and, in the case of FIG. 2B, a fused alumina material.
Figure 2B:
Figure 2B:

The procedure of Example 1 was repeated exactly as disclosed therein, except that growth of the final ceramic composite bodies was carried out using 99.7% pure aluminum as the parent metal rather than the 380.1 alloy described in Example 1. In this case growth occurred readily into the grown and crushed filler material, yielding a weight gain (measured as in Example 1) of 65% and a quite uniform growth morphology, as shown in FIG. 2A. By contrast, no growth occurred into the fused alumina filler and, for this specimen shown in FIG. 2B, the weight gain was negative, presumably reflecting the elimination of minor amounts of volatile constituents from the boat and bedding materials. Thus, in this Example, growth of the ceramic matrix into the grown and crushed filler bed was obviously favored over growth into conventional fused alumina particles. Mechanical properties of the composite obtained by growth into the grown and crushed filler material were very similar to, or slightly higher than, those obtained on the material with the same filler produced as described in Example 1.

What is claimed is:

1. A self-supporting ceramic composite body comprising:
   a mass of filler material comprising (i) a second particulate ceramic composite filler material which comprises a first filler material embedded by a first ceramic matrix comprising a first oxidation reaction product of a first parent metal and a first oxidant and (ii) at least a third filler material; and
   a three-dimensionally interconnected second ceramic matrix comprising a second oxidation reaction product of a second parent metal and a second oxidant which embeds said mass of filler material.

2. A self-supporting ceramic composite body comprising:
   a second particulate ceramic composite filler material which comprises a first filler material embedded by a first ceramic matrix comprising a first oxidation reaction product of a first parent metal and a first oxidant, wherein said first filler material has a different composition than said first oxidation reaction product; and
   a three-dimensionally interconnected second ceramic matrix comprising a second oxidation reaction product of a second parent metal and a second oxidant which embeds said second particulate ceramic composite filler material.

3. A self-supporting ceramic composite body comprising:
   a preform of a second particulate ceramic composite filler material which comprises a first filler material embedded by a first ceramic matrix comprising a first oxidation reaction product of a first parent metal and first oxidant; and
   a three-dimensionally interconnected second ceramic matrix comprising a second oxidation reaction product of a second parent metal and a second oxidant which embeds said preform of second particulate ceramic composite filler material.

4. The self-supporting ceramic composite body of claim 1, wherein said second ceramic matrix comprises at least one of unreacted parent metal and voids.

5. The self-supporting ceramic composite body of claim 2, wherein said second ceramic matrix comprises at least one of unreacted parent metal and voids.

6. The self-supporting ceramic composite body of claim 3, wherein said second ceramic matrix comprises at least one or unreacted parent metal and voids.

7. The self-supporting ceramic composite body of claim 1, wherein said mass of filler material is present in a layered form so that the volume percent of said at least one additional filler material is greater in at least one portion of said mass of filler material than in another portion of said mass of filler material.

8. The self-supporting ceramic composite body of claim 4, wherein said second ceramic matrix comprises voids and further wherein the volume percent of said voids is greater in at least one portion of said second ceramic matrix than in another portion of said second ceramic matrix.

9. The self-supporting ceramic composite body of claim 5, wherein said second ceramic matrix comprises voids and further wherein the volume percent of said voids is greater in at least one portion of said second ceramic matrix than in another portion of said second ceramic matrix.

10. The self-supporting ceramic composite body of claim 6, wherein said second ceramic matrix comprises voids and further wherein the volume percent of said voids is greater in at least one portion of said second ceramic matrix than in another portion of said second ceramic matrix.

11. The self-supporting ceramic composite body of claim 1, wherein said first oxidation reaction product and said second oxidation reaction product have essentially the same composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

12. The self-supporting ceramic composite body of claim 2, wherein said first oxidation reaction product and said second oxidation reaction product have essentially the same composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

13. The self-supporting ceramic composite body of claim 3, wherein said first oxidation reaction product and said second oxidation reaction product have essentially the same composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

14. The self-supporting ceramic composite body of claim 1, wherein said first oxidation reaction product and said second oxidation reaction product are different in composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

15. The self-supporting ceramic composite body of claim 2, wherein said first oxidation reaction product and said second oxidation reaction product are different in composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

16. The self-supporting ceramic composite body of claim 3, wherein said first oxidation reaction product and said second oxidation reaction product are different in composition and further wherein said first oxidation reaction product and said second oxidation reaction product comprise at least one material selected from the group consisting of an oxide, nitride, boride or carbide of at least one parent metal selected from the group consisting of aluminum, silicon, titanium, hafnium and zirconium.

17. The self-supporting ceramic composite body of claim 1, wherein said additional filler material comprises at least one material selected from the group consisting of alumina, magnesia, hafnia, zirconia, silicon carbide, silicon nitride, zirconium nitride and titanium nitride.

18. The self-supporting ceramic composite body of claim 1, wherein said first oxidation reaction product comprises alumina, said first filler material comprises alumina, said additional filler material comprises alumina and said second oxidation reaction product comprises alumina.

19. The self-supporting ceramic composite body of claim 2, wherein said first oxidation reaction product comprises alumina, said first filler material comprises silicon carbide and said second oxidation reaction product comprises alumina.

* * * * *

UNITED STATES PATENT AND TRADEMARK OFFICE
CERTIFICATE OF CORRECTION

PATENT NO.   : 5,141,902
DATED        : August 25, 1992
INVENTOR(S)  : Marc S. Newkirk et al.

It is certified that error appears in the above-identified patent and that said Letters Patent is hereby corrected as shown below:

```
Column 2,   line 20:  after "Patent" delete --Applications (A) U.S. Pat.---.
            line 64:  after "Patent" delete --Applica---.
            line 65:  before "No." delete --tions (B) U.S. Pat.---.
Column 3,   line 17:  after "Patent" delete --Applications (C) U.S. Pat.---.
Column 4,   line 60:  change "compatability" to --compatibility--.
Column 6,   line 42:  change "of" to --or--.
Column 7,   line 61:  after "composite" delete --structure--.
Column 9,   line 24:  change first entry "or" to --on--.
            line 61:  change "effect" to --effective--.
Column 10,  line 19:  change "1989" to --1986--.
Column 13,  line 30:  change "MG" to --Mg--.
            line 39:  change "ia" to --is--.
```

Signed and Sealed this

Eighth Day of November, 1994

Attest:

BRUCE LEHMAN

*Attesting Officer*      *Commissioner of Patents and Trademarks*